US008274993B2

(12) United States Patent
Sharma et al.

(10) Patent No.: US 8,274,993 B2
(45) Date of Patent: Sep. 25, 2012

(54) FIBRE CHANNEL DYNAMIC ZONING

(75) Inventors: Samar Sharma, San Jose, CA (US); Chandan Mishra, Sunnyvale, CA (US); Fabio Maino, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 892 days.

(21) Appl. No.: 11/454,239

(22) Filed: Jun. 16, 2006

(65) Prior Publication Data

US 2007/0291785 A1    Dec. 20, 2007

(51) Int. Cl.
*H04J 3/16* (2006.01)
(52) U.S. Cl. ...................................... 370/465
(58) Field of Classification Search .................. None
See application file for complete search history.

(56) References Cited

U.S. PATENT DOCUMENTS

| | | | | |
|---|---|---|---|---|
| 4,897,833 A * | 1/1990 | Kent et al. | ...................... | 370/447 |
| 6,160,813 A | 12/2000 | Banks et al. | | |
| 6,965,559 B2 * | 11/2005 | Grabauskas et al. | .......... | 370/216 |
| 7,454,487 B1 * | 11/2008 | Becher et al. | ................. | 709/223 |
| 2002/0176417 A1 | 11/2002 | Wu et al. | | |
| 2003/0131182 A1 * | 7/2003 | Kumar et al. | ...................... | 711/5 |
| 2003/0172149 A1 * | 9/2003 | Edsall et al. | .................. | 709/224 |
| 2005/0268302 A1 | 12/2005 | Geib et al. | | |
| 2007/0038679 A1 * | 2/2007 | Ramkumar et al. | .......... | 707/200 |
| 2007/0067435 A1 * | 3/2007 | Landis et al. | ................. | 709/224 |
| 2007/0282951 A1 * | 12/2007 | Selimis et al. | ................. | 709/205 |

OTHER PUBLICATIONS

PCT, Notification of Transmittal of the International Search Report and the Written Opinion of the International Searching Authority, or The Declaration, Oct. 7, 2008. PCT/US 07/71259.

* cited by examiner

*Primary Examiner* — Nittaya Juntima
*Assistant Examiner* — Rhonda Murphy
(74) *Attorney, Agent, or Firm* — Weaver Austin Villeneuve & Sampson LLP

(57) ABSTRACT

Zone information is automatically and dynamically configured and managed in a fiber channel storage area network upon detection of network events. Some examples of events that trigger automatic dynamic zone updates include virtual port creation, intrusion/anomaly detection, arbitration decision completion, misconfiguration detection, and device malfunction. The newly created/updated zones are propagated through the fiber channel fabric and provide access control.

20 Claims, 7 Drawing Sheets

|  | Initiator 201 | Target 203 | Type 205 | LUN Zoning 207 |
|---|---|---|---|---|
| Zone 211 | initiatorA | targetW | hard | LUN1 LUN3 |
| Zone 213 | initiatorB | targetW | soft | LUN2 LUN4 |
| Zone 215 | initiatorC | targetX | hard | disabled |
| Zone 217 | initiatorD | targetY | hard | disabled |

Figure 2

FIBRE CHANNEL DYNAMIC ZONING

BACKGROUND OF THE INVENTION

1. Field of the Invention

The present invention generally relates to storage area networking. More specifically, the present invention provides techniques and mechanisms for improved zoning in a storage area network.

2. Description of Related Art

A storage area network includes a number of entities including hosts, fibre channel switches, disk arrays, tape devices, etc. Access control is often an important consideration in storage area network implementation. Some access control mechanisms are available for fibre channel devices. For example, a fibre channel switch may include a zoning table that specifies access rights for various initiators and targets in a fibre channel storage area network.

However, current zoning mechanisms for providing access control in storage area networks have significant limitations. Consequently, it is desirable to provide techniques for improving access control mechanisms in storage area networks.

SUMMARY OF THE INVENTION

Zone information is automatically and dynamically configured and managed in a fibre channel storage area network upon detection of network events. Some examples of events that trigger automatic dynamic zone updates include virtual port creation, intrusion/anomaly detection, arbitration decision completion, misconfiguration detection, and device malfunction. The newly created/updated zones are propagated through the fibre channel fabric and provide access control.

In one embodiment, a technique for updating zoning information is provided. A message is received from an initiator in a fibre channel storage area network. One or more zones including the initiator are identified. The one or more zones are identified using zoning information associated with a fibre channel switch. The one or more zones indicate one or more fibre channel storage area network devices that the initiator is allowed to access. Notification of a fibre channel storage area network event is received. Zoning information associated with the fibre channel switch is updated.

In another example, a fibre channel switch is provided. The fibre channel switch includes an interface and a processor. The interface is operable to receive a message from an initiator in a fibre channel storage area network. The processor is operable to identify one or more zones including the initiator. The one or more zones are identified using zoning information associated with a fibre channel switch. The one or more zones indicate one or more fibre channel storage area network devices that the initiator is allowed to access. The processor is further operable to update zoning information associated with the fibre channel switch upon receiving notification of a fibre channel storage area network event.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIG. 2 is a diagrammatic representation showing a zoning table.

DETAILED DESCRIPTION OF SPECIFIC EMBODIMENTS

Figure 1:
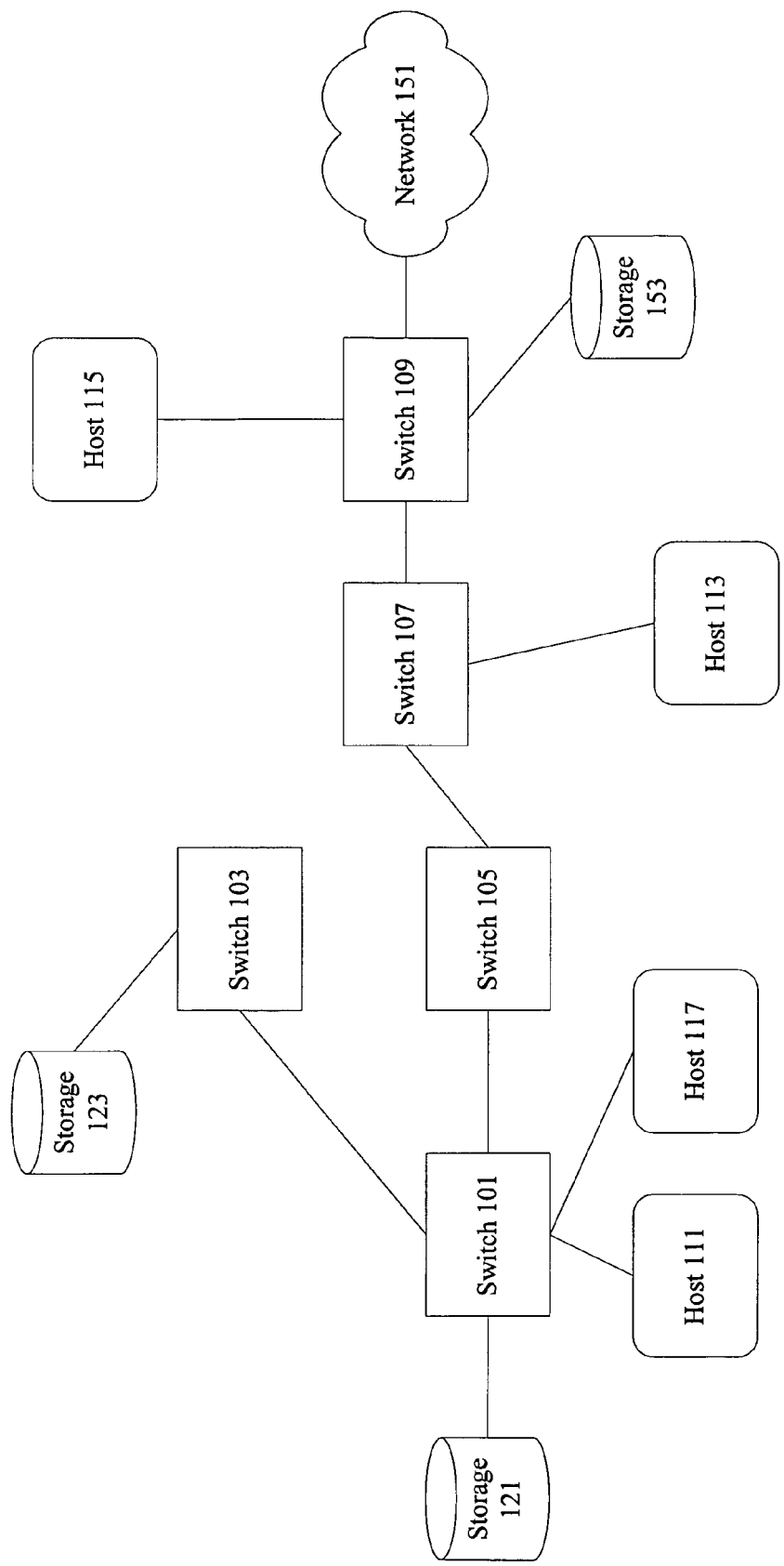
FIG. 1 is a diagrammatic representation showing a fibre channel fabric.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fibre channel storage area networks. However, it should be noted that the techniques of the present invention can be applied to different variations and flavors of fibre channel storage area networks as well as to alternatives to fibre channel storage area networks. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Zones in a fibre channel storage area network allow organization of devices connected to the storage area network into logical entity groups. In some examples, a storage area network includes iniatitors such as hosts or servers and targets such as disk arrays and tape drives. An administrator may want to configure resources in a manner such that only particular initiators can access particular targets. One mechanism for controlling access is zoning. A zone typically includes two or more members and communication within each zone is restricted to its members.

Zones include soft zones and hard zones. Soft zones enforce access during a fabric login (Flogi) sequence. Subsequent communications are then no longer controlled. Hard zones enforce access during each and every message transmitted between entities in a storage area network. By default, an initiator has both read and write access to a target when they are members of the same zone. A read-only zone feature allows members to have only read access to the media within a read-only fibre channel zone. A target can have multiple logical unit numbers (LUNs) behind it. If the device is part of a zone, a member of the zone can access any LUN in the device. With LUN zoning, access to specific LUNs associated with a device can be restricted. LUN masking and mapping restricts server access to specific LUNs. Unzoned devices and LUNs may be placed into default zones.

Zones are configured by administrators or created based upon administrator action. An administrator specifies members of a particular zone, whether a zone is read only, what type of zone is being used, and whether LUN zoning of LUN masking should be activated. The administrator may also be charged with configuring zone sets, which are groups of zones that are used at any given time. However, configuration of zones is prone to error. Furthermore, by the time a misconfiguration or security breach is detected and a new zone is configured, it is often too late.

Consequently, the techniques of the present invention provide dynamic zones that are automatically created and managed based on storage area network events. The network events can include data path events or control events or a combination of both. Dynamic zones provide an access control mechanism that is automatically and rapidly configured without requiring administrative action. In many instances, dynamic zones can be automatically as well as manually configured.

FIG. 1 is a diagrammatic representation of one example of a network that can use the techniques and mechanisms of the present invention. FIG. 1 shows a storage area network implemented using fibre channel. A switch 101 is coupled to switches 103 and 105 as well as to a host 111 and storage 121. In one embodiment, host 111 is a server or client system while storage 121 is any storage subsystem such as a single disk or a redundant array of independent disks (RAID). Switch 105 is coupled to switch 107. Switch 107 is connected to host 113 and switch 103 is connected to storage resource 123. Switch 109 is connected to host 115, switch 107, storage resource 153, and an external network 151 that may or may not use fibre channel. In order for a host 111 to access network 151, a path going through switch 105 can be used. It should be noted that any apparatus including a processor, memory, and a connection to a fibre channel fabric can be referred to as a fibre channel switch.

Ports used to connect switches to each other in a fibre channel network are referred to herein as non fabric-ports. Non fabric-ports include interswitch ports (E-ports). Ports used to connect a switch to a host are referred to herein as fabric-ports (F-ports). In one example, E-ports are used to connect switch 105 to switch 107 while F-ports are used to connect switch 107 to host 113. Similarly, fabric loop-ports (FL-ports) are used to connect switch 103 to storage resource 123.

According to various embodiments, a packet transmitted from host 111 to a network 151 or to storage resource 153 includes parameters such as the exchange identifier, a sequence, and a sequence number. The exchange identifier can provide information on what exchange the packet belongs to. The sequence can provide information on what portion of the exchange the packet belongs to while the sequence number can provide information on how the packets should be ordered. Sequence numbers can be used to allow for in order delivery of fibre channel packets.

Storage resources 123 and 153 may be fabric loops coupled respectively to switches 103 and 109 through FL-ports. The fabric loops typically include multiple storage devices. In one example, a loop is a Small Computer Systems Interface (SCSI) loop that allows connection of 8 or 16 devices in a half-duplex framework.

FIG. 2 is a diagrammatic representation showing one example of a zoning table. It should be noted that a wide variety of data structures can be used to hold zoning information, and the data structures for holding zoning information will be referred to herein as zoning tables. Multiple zones 211, 213, 215, and 217 are configured. Fields include initiator field 201, target field 203, type 205, and LUN zoning 207. According to various embodiments, each zone is configured with a single initiator and a single target. However, it should be recognized that each zone may include multiple initiators and multiple targets. Initiators include hosts and servers while targets include disk arrays and tape devices. The type field 205 is used to identify whether a zone is a hard zone or a soft zone. A LUN zoning field 207 is used to identify what LUNs are associated with a particular target. A LUN masking field may also be included.

According to various embodiments, zone 211 includes initiator A and target W. Zone 211 is a hard zone that includes LUN1 and LUN3 associated with target W. Zone 213 includes initiator B and target W. Both zones 211 and 213 include target W. Zone 213 is a soft zone and includes LUN2 and LUN4 associated with target W. Zone 215 includes initiator C and target X. Zone 215 is a hard zone and LUN zoning is disabled with respect to zone 215. Zone 217 includes initiator D and target Y. Zone 215 is a hard zone and LUN zoning is disabled with respect to zone 215.

Figure 3:
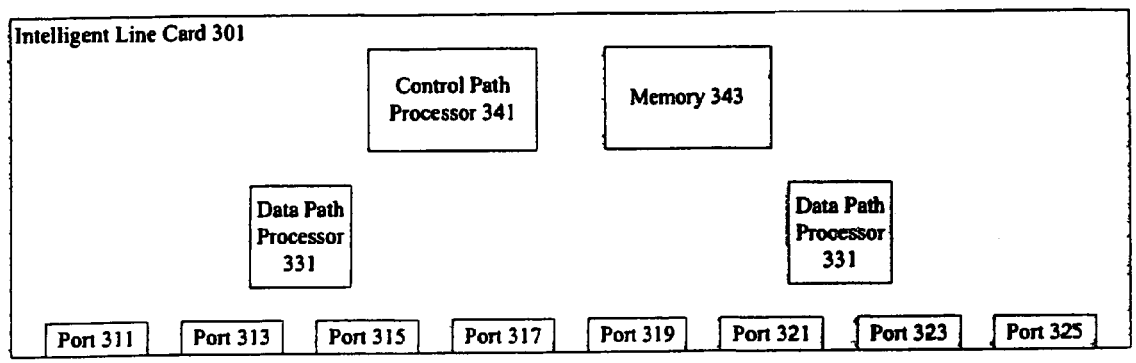
FIG. 3 is a diagrammatic representation showing an intelligent line card.

FIG. 3 is a diagrammatic representation of one example of an intelligent line card. According to various embodiments, the intelligent line card includes ports 311-325, data path processors 331 and 333, control path processor 341, and memory 343. Data path processors 331 and 333 are used to identify flow information and exchange information and output the data to the appropriate fibre channel switch port. The control path processor 341 is used to handle management functions and exceptions. Memory 343 can be used to hold statistical data gathered by a data path processor. In one embodiment, 8 data path processors are provided for 32 ports.

Although separate data path and control path processors are provided, it should be noted that in some instances, a single processor may be used to handle network traffic and control functions and exceptions. In other examples, additional processors may be provided. Any line card having hardware support for fibre channel packet snooping is referred to herein as an intelligent line card.

According to various embodiments, each the data path processor and each control path processor operate as mechanisms for detecting network events and triggering zone updates. For example, data path or control path processors may be configured to recognize arbitration algorithms for making arbitration decisions in a cluster.

Figure 4:
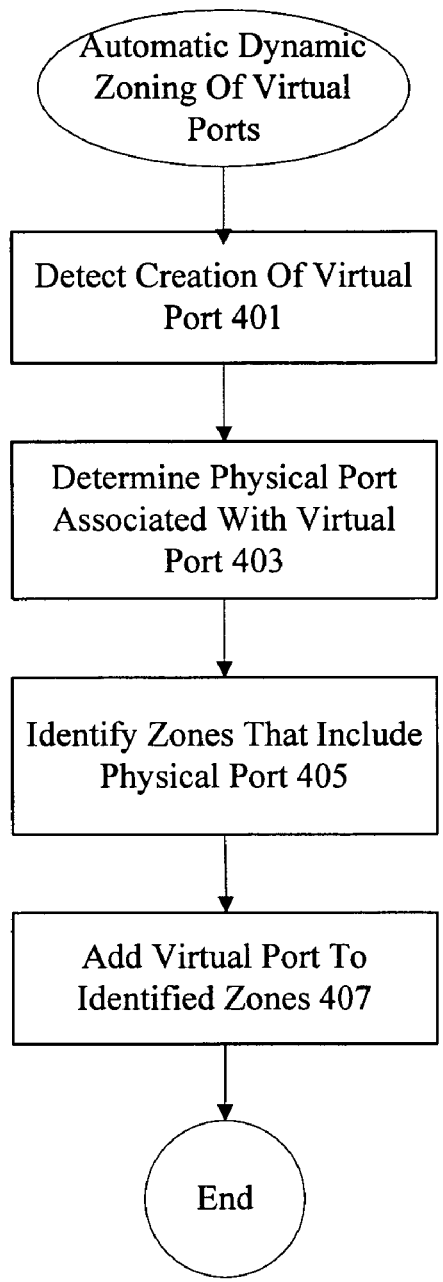
FIG. 4 is a flow process diagram depicting a technique for updating a zone upon introduction of a new network node.

FIG. 4 is a flow process diagram showing one application of automatically configuring dynamic zones when virtual ports such as virtual targets or virtual initiators are used.

Conventional storage area networks are implemented with the goal of providing high availability. Storage area networks typically include devices such as disk arrays, tape devices, and hosts. The devices are often connected using multiple fibre channel switches. In order to handle potential disk failures, data is often replicated using mechanisms such as mirroring to ensure that a standby target device can take over should an active target device fail. The failover from the primary to the secondary target involves substantial downtime and requires manual intervention by the SAN administrator. The administrator is expected to perform zoning changes and reconfiguration of particular initiators. In some examples, all the initiators now have to be rezoned to the secondary target and the zone set has to be reactivated in the fabric. Sometimes the full zone sets are not synchronized with active zone sets and hence the secondary target configuration has to be redone by the administrator. Initiators such as particular servers also have to be reconfigured because the secondary target pWWN and fibre channel identifier (FC_ID) are different from the primary target pWWN and FC_ID. Some of these servers have the target FC_ID encoded in system configuration files necessitating server reboots to allow an update to the FC_ID.

Rezoning and reconfiguration require a substantial amount of time. For an environment including two clustered hosts and a database size of 2 TB, rezoning and reconfiguration takes over 4 hours. Zoning configuration is disruptive to fabric operation. The reconfiguration of driver files is error prone.

In order to reduce the downtime and the risks associated with device migration such as target or initiator failover, various embodiments of the present invention allow virtualization of targets and initiators at a fibre channel storage area network switch. In some examples, initiators are presented with a virtual target and targets are presented with a virtual initiator. If a particular initiator or target fails, mapping mechanisms are updated at a fibre channel switch to allow transparent device switchover. Initiators and targets no longer need to be restarted.

By providing virtualized targets and initiators, the amount of time required for migrating between targets and initiators is reduced. According to various embodiments, minimal configuration changes are required for fabric switches and no configuration changes are required for targets and initiators. Targets and initiators continue to access a virtualized device without any knowledge of migration of physical devices. Existing zoning configurations are used for grouping of initiators and targets. In some examples, a single command is used to perform failover. The failover operation can be reported to initiators and targets so that pending I/O requests are aborted and I/O requests are restarted.

To facilitate automatic dynamic zoning of virtual ports, virtual port creation is detected at 401. Virtual port creation may be detected at various switches by using control or data path processors associated with intelligent line cards. A new virtual port may be a new virtual target corresponding to a primary physical disk and a secondary physical disk. After detecting the creation of a virtual port such as a virtual target, the one or more physical ports associated with the virtual port are determined at 403. In some examples, the one or more physical ports associated with the virtual port are determined by referencing a virtual port to physical port mapping table. At 405, zones including the one or more physical ports associated with the virtual port are identified. At 407, the virtual port is added to the identified zones.

Figure 5:
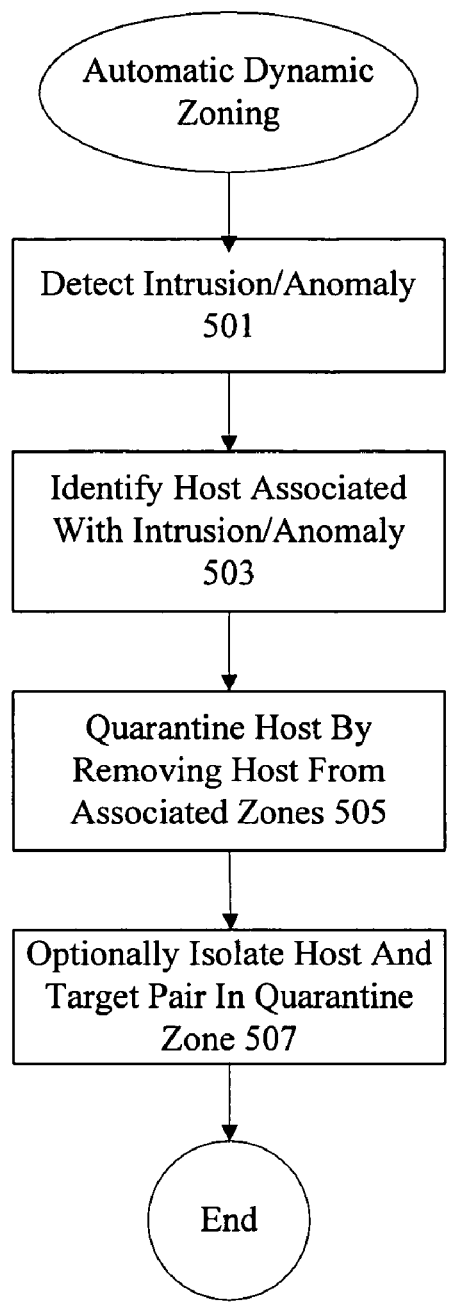
FIG. 5 is a flow process diagram depicting a technique for updating a zone upon detection of intrusion or anomaly.

FIG. 5 is a flow process diagram showing a technique for automatic dynamic zoning upon detection of intrusion or anomaly. Criteria for intrusion or anomalous activities can be defined by an administrator. One example of a criterion for detecting intrusion is detection of a user accessing a file that does not provide read privileges to the particular user. Even though a particular host and a particular target may be in the same zone, a user accessing a file through a particular host and target may not have authorization. One example of an anomaly may be repeated failed attempts to access the same storage block. According to various embodiments, a switch detects an intrusion/anomaly at 501. At 503, a host associated with the intrusion/anomaly is identified. In one example, the host associated with the intrusion/anomaly is quarantined at 505. The host may be quarantined by removing the host from any zone in which it is a member. In some examples, it may be desirable to isolate a host/target pair at 507. In other examples, a host may be quarantined in the same manner upon detection of misconfiguration. This can prevent improper writing or reformatting of disks when initiators are connected to targets without proper authorization.

Figure 6:
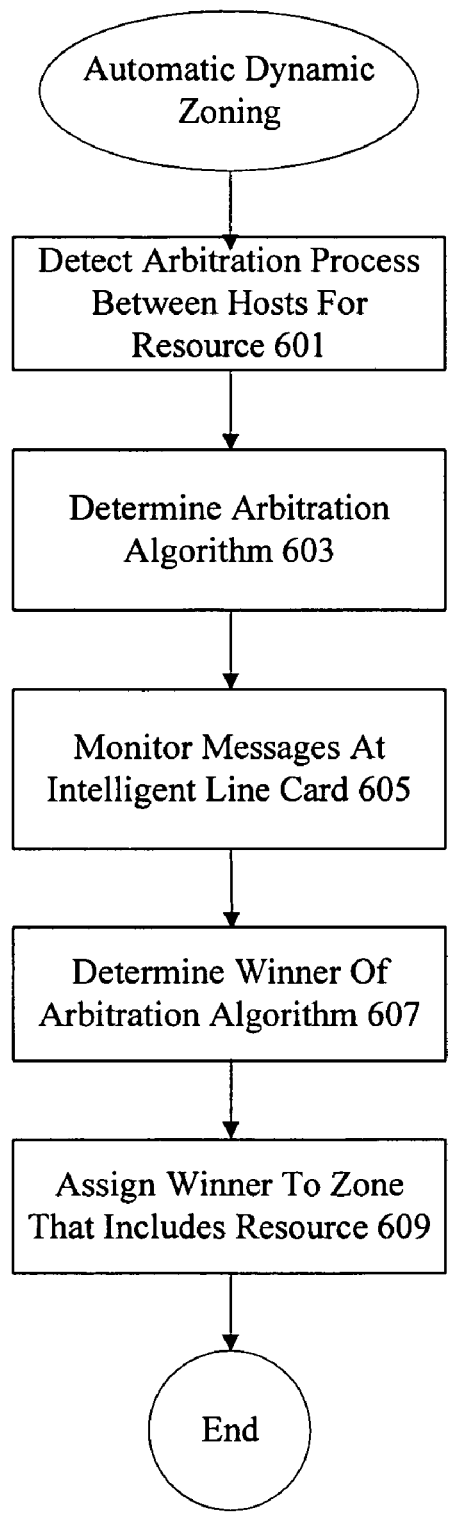
FIG. 6 is a flow process diagram showing a technique for enforcing an arbitration decision.

FIG. 6 is a flow process diagram showing a technique for automatic dynamic zoning upon arbitration. Fibre channel storage area networks provide arbitration mechanisms to allow multiple initiators the ability to vie for resources such as disk arrays. When a host boots up, an arbitration algorithm is used to determine who owns what resources. In some examples, an arbitration mechanism used to determine which initiator gets access to a particular disk array is a simple round robin scheme. In other examples, more complicated arbitration algorithms are used at a switch. According to various embodiments, a fibre channel switch has knowledge of the different arbitration algorithms used. At 601, a switch detects an arbitration process between hosts for a resource.

At 603, the arbitration algorithm is determined. At 605, messages are monitored. The switch can detect an arbitration process by snooping message transmitted between the hosts and the resource. The snooping can be performed using an intelligent line card included in a fibre channel switch. At 607, the winner associated with an arbitration process is determined. At 609, the switch automatically assigns the winner of the arbitration process to a zone with the resource. According to various embodiments, the loser of the arbitration process is explicitly not included in a zone with the resource. Zone information can also be determined at other fibre channel switches as well, either by propagation or independent automatic dynamic determination.

The techniques of the present invention can be implemented in a variety of devices such as routers and switches. In some examples, the reverse path delay estimation techniques can be implemented on any network device. In other examples, the techniques of the present invention can also be implemented at tunneling switches used to transmit storage application data over IP networks. Although particular examples showing specific network events have been described, it should be noted that the techniques of the present invention can also be used to provide automatic dynamic zoning for a variety of network events that lead to the configuration and/or management of zones.

Figure 7:
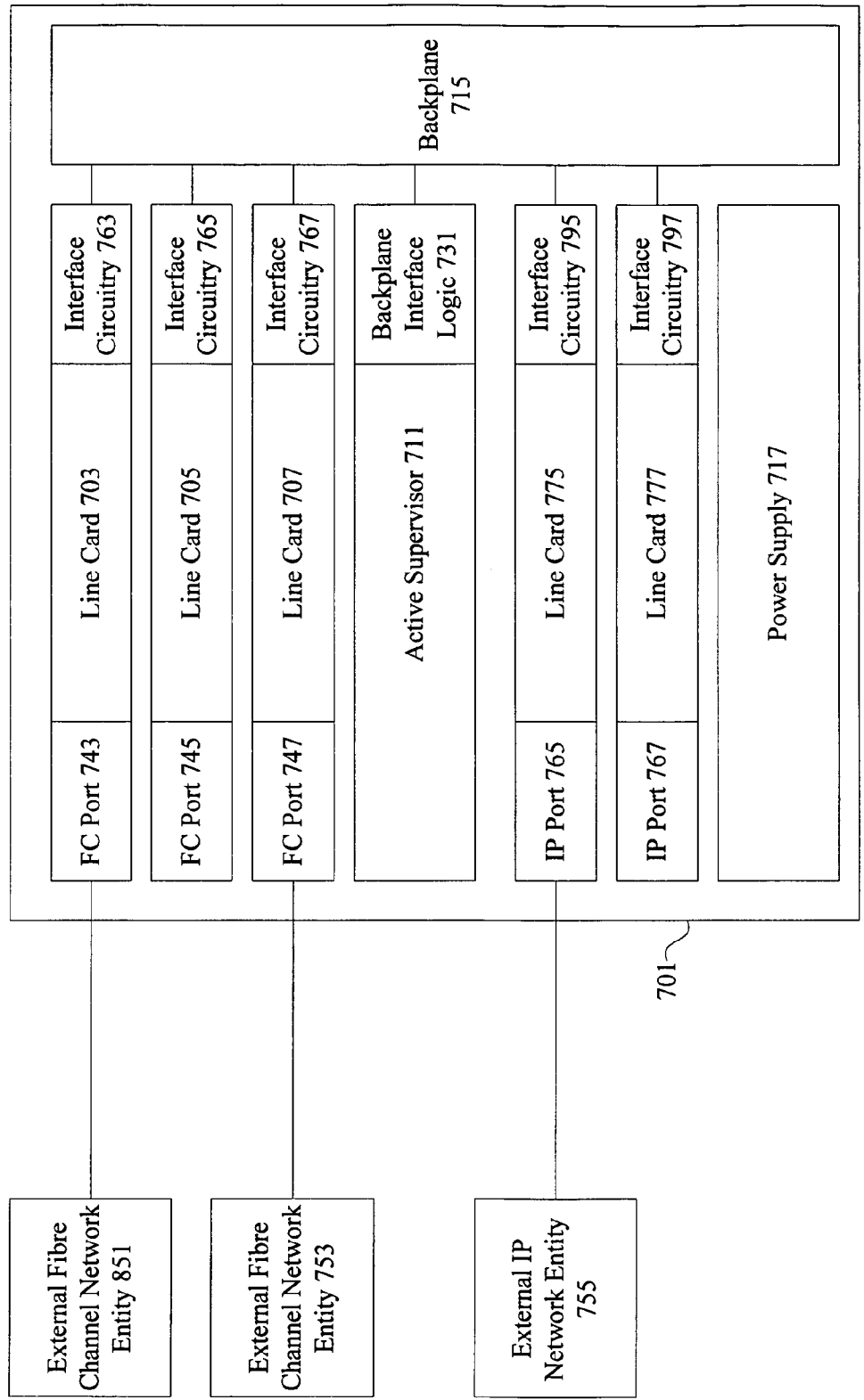
FIG. 7 is a diagrammatic representation showing a network device.

FIG. 7 is a diagrammatic representation of one example of a fibre channel switch that can be used to implement techniques of the present invention. Although one particular configuration will be described, it should be noted that a wide variety of switch and router configurations are available. The tunneling switch 701 may include one or more supervisors 711. According to various embodiments, the supervisor 711 has its own processor, memory, and storage resources.

Line cards 703, 705, and 707 can communicate with an active supervisor 711 through interface circuitry 783, 785, and 787 and the backplane 715. According to various embodiments, each line card includes a plurality of ports that can act as either input ports or output ports for communication with external fibre channel network entities 751 and 753. The backplane 715 can provide a communications channel for all traffic between line cards and supervisors. Individual line cards 703 and 707 can also be coupled to external fibre channel network entities 751 and 753 through fibre channel ports 743 and 747.

External fibre channel network entities 751 and 753 can be nodes such as other fibre channel switches, disks, RAIDS, tape libraries, or servers. It should be noted that the switch can support any number of line cards and supervisors. In the embodiment shown, only a single supervisor is connected to the backplane 715 and the single supervisor communicates with many different line cards. The active supervisor 711 may be configured or designed to run a plurality of applications such as routing, domain manager, system manager, and utility applications.

According to one embodiment, a routing application is configured to populate hardware forwarding tables used to direct frames towards their intended destination by choosing the appropriate output port and next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

According to various embodiments, the switch also includes line cards 775 and 777 with IP interfaces 765 and 767. In one example, the IP port 765 is coupled to an external IP network entity 755. The line cards 775 and 777 can also be coupled to the backplane 715 through interface circuitry 795 and 797.

According to various embodiments, the switch can have a single IP port and a single fibre channel port. In one embodiment, two fibre channel switches used to form an FCIP tunnel each have one fibre channel line card and one IP line card. Each fibre channel line card connects to an external fibre channel network entity and each IP line card connects to a shared IP network.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A method, comprising:
    detecting an arbitration process between a first host and a second host for a first storage resource, the first storage resource included in a first zone in a fibre channel storage area network;
    monitoring messages between the first host and the first storage resource by snooping messages between the first host and the first storage resource;
    selecting the first host using an arbitration algorithm;
    updating zoning information associated with the first host by dynamically assigning the first host to the first zone and excluding the second host from the first zone;
    propagating updated zoning information through the fibre channel storage area network.

2. The method of claim 1, wherein the first storage resource is a first disk array.

3. The method of claim 1, wherein the first host is a first fibre channel initiator.

4. The method of claim 1, wherein the second host is a second fibre channel initiator.

5. The method of claim 1, wherein the first zone specifies fibre channel storage area network devices that the first host is allowed to access.

6. The method of claim 1, wherein the first zone is updated dynamically and manually.

7. The method of claim 1, wherein the arbitration process is detected at a fibre channel storage area network switch.

8. The method of claim 7, wherein messages are monitored using an intelligent line card at the fibre channel storage area network switch.

9. The method of claim 1, wherein the second host is included in a second zone.

10. A system, comprising:
    an interface configured to detect an arbitration process between a first host and a second host for a first storage resource, the first storage resource included in a first zone in a fibre channel storage area network;
    a processor configured to monitor messages between the first host and the first storage resource by snooping messages between the first host and the first storage resource, select the first host using an arbitration algorithm, and update zoning information associated with the first host by dynamically assigning the first host to the first zone and excluding the second host from the first zone;
    wherein the interface is further configured to propagate updated zoning information through the fibre channel storage area network.

11. The system of claim 10, wherein the first storage resource is a first disk array.

12. The system of claim 10, wherein the first host is a first fibre channel initiator.

13. The system of claim 10, wherein the second host is a second fibre channel initiator.

14. The system of claim 10, wherein the first zone specifies fibre channel storage area network devices that the first host is allowed to access.

15. The system of claim 10, wherein the first zone is updated dynamically and manually.

16. The system of claim 10, wherein the system is a fibre channel storage area network switch.

17. The system of claim 10, wherein messages are monitored using an intelligent line card at the fibre channel storage area network switch.

18. The system of claim 10, wherein the second host is included in a second zone.

19. An apparatus, comprising:
    means for detecting an arbitration process between a first host and a second host for a first storage resource, the first storage resource included in a first zone in a fibre channel storage area network;
    means for monitoring messages between the first host and the first storage resource by snooping messages between the first host and the first storage resource;
    means for selecting the first host using an arbitration algorithm;
    means for updating zoning information associated with the first host by dynamically assigning the first host to the first zone and excluding the second host from the first zone;

means for propagating updated zoning information through the fibre channel storage area network.

20. A non-transitory computer readable medium, comprising:
   computer code for detecting an arbitration process between a first host and a second host for a first storage resource, the first storage resource included in a first zone in a fibre channel storage area network;
   computer code for monitoring messages between the first host and the first storage resource by snooping messages between the first host and the first storage resource;
   computer code for selecting the first host using an arbitration algorithm;
   computer code for updating zoning information associated with the first host by dynamically assigning the first host to the first zone and excluding the second host from the first zone;
   computer code for propagating updated zoning information through the fibre channel storage area network.

* * * * *